US011309557B2

(12) United States Patent
Bowman

(10) Patent No.: US 11,309,557 B2
(45) Date of Patent: Apr. 19, 2022

(54) METHOD TO CONTROL MAXIMUM CURRENT FOR A FUEL CELL

(71) Applicant: Intelligent Energy Limited, Loughborough (GB)

(72) Inventor: Jeremy Bowman, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 129 days.

(21) Appl. No.: 16/730,140

(22) Filed: Dec. 30, 2019

(65) Prior Publication Data

US 2020/0136159 A1      Apr. 30, 2020

Related U.S. Application Data

(63) Continuation of application No. 15/761,376, filed as application No. PCT/GB2016/053020 on Sep. 28, 2016, now Pat. No. 10,522,857.

(30) Foreign Application Priority Data

Sep. 29, 2015   (GB) ...................... 1517175

(51) Int. Cl.
*H01M 8/0432*      (2016.01)
*H01M 8/04302*     (2016.01)
(Continued)

(52) U.S. Cl.
CPC ..... *H01M 8/04302* (2016.02); *H01M 8/0432* (2013.01); *H01M 8/0488* (2013.01);
(Continued)

(58) Field of Classification Search
CPC ........... H01M 8/04302; H01M 8/0488; H01M 8/0491; H01M 8/0432; H01M 8/04492;
(Continued)

(56) References Cited

U.S. PATENT DOCUMENTS

| 2005/0214602 A1 | 9/2005 | Sinha et al. |
| 2010/0261079 A1 | 10/2010 | Kells et al. |

(Continued)

FOREIGN PATENT DOCUMENTS

| DE | 10109151 A1 | 9/2002 |
| EP | 2355219 A1 | 8/2011 |

(Continued)

OTHER PUBLICATIONS

International Patent Application No. PCT/GB2016/053020; Int'l Written Opinion and the Search Report; dated Dec. 18, 2016; 10 pages.

*Primary Examiner* — Gary D Harris
(74) *Attorney, Agent, or Firm* — Bakerhostetler LLP

(57) ABSTRACT

The disclosure relates to a fuel cell stack and corresponding method of operating the fuel cell stack. The method comprises: determining a maximum allowable current that may be drawn from the fuel cell stack; repeatedly determining a magnitude of change to the prevailing maximum allowable current based on a prevailing allowable current ramp rate and an actual measured current of the fuel cell stack; updating the maximum allowable current according to the periodically determined magnitude of change; and controlling operating parameters of the fuel cell stack according to the prevailing maximum allowable current.

11 Claims, 8 Drawing Sheets

(51) Int. Cl.
*H01M 8/04858* (2016.01)
*H01M 8/04492* (2016.01)
*H01M 8/04537* (2016.01)
*H01M 8/04303* (2016.01)

(52) U.S. Cl.
CPC ..... *H01M 8/0491* (2013.01); *H01M 8/04303* (2016.02); *H01M 8/04492* (2013.01); *H01M 8/04559* (2013.01); *H01M 8/04589* (2013.01)

(58) Field of Classification Search
CPC ......... H01M 8/04559; H01M 8/04589; H01M 8/04303; H01M 8/04574; H01M 8/04895; H01M 8/04925; H01M 2220/20; Y02E 60/10; Y02E 60/50; Y02T 90/40
USPC ........................................................ 429/429
See application file for complete search history.

(56) References Cited

U.S. PATENT DOCUMENTS

2011/0200895 A1* 8/2011 Sinha ................ H01M 8/04559
429/413
2015/0188158 A1 7/2015 Kells et al.

FOREIGN PATENT DOCUMENTS

EP 2546911 A1 1/2013
EP 2712014 A1 3/2014

* cited by examiner

METHOD TO CONTROL MAXIMUM CURRENT FOR A FUEL CELL

CROSS-REFERENCE TO RELATED APPLICATIONS

This application is a Continuation of U.S. patent application Ser. No. 15/761,376 filed Mar. 19, 2018, which is a 371 International Phase Application of International Patent Application No. PCT/GB2016/053020 filed Sep. 28, 2016, which claims the benefit of GB Patent Application No. 1517175.4 filed Sep. 29, 2015, the entire contents of which are incorporated herein in their entirety.

DESCRIPTION

The present disclosure relates to a controller and associated method for a fuel cell system and in particular, although not exclusively, to fuel cell systems for high load applications such as powering vehicles.

In vehicular applications, the electrical load on a fuel cell stack can vary significantly and rapidly depending on changes in use of the vehicles. For example, the demands of an electrical load, such as an electric motor, may be negligible when the vehicle is stopped or parked, but rise almost instantaneously to a relatively high value if the vehicle's driver decides to accelerate away sharply. If the electrical load attempts to draw more power from the fuel cell system than it can provide at any given instance, the cell voltage of the fuel cell stack may be reduced to a trip level or the thermal dissipation from the fuel cell stack may cause the temperature of the fuel cell stack to exceed a thermal trip level.

Either of these scenarios could result in the failure of the fuel cell system as an effective power supply and cause total power loss to the vehicle. Such an eventuality may be completely unacceptable from a safety perspective in vehicular applications.

According to a first aspect of the invention there is provided a method of operating a fuel cell system comprising: determining a maximum allowable current that may be drawn from the fuel cell system; repeatedly determining a magnitude of change to the prevailing maximum allowable current based on a prevailing allowable current ramp rate and an actual measured current of the fuel cell system; updating the maximum allowable current according to the repeatedly determined magnitude of change; and controlling operating parameters of the fuel cell system according to the prevailing maximum allowable current.

The derivation of a current limit is required in order to allow an external electrical load on the fuel cell system to draw an amount of power that is within the capability of the fuel cell system to provide.

The step of controlling operating parameters of the fuel cell system may comprise controlling an electrical load on the fuel cell system. The determined magnitude of change comprises an increment or a decrement. The magnitude of change may be determined according to the smaller of a magnitude of change corresponding to the prevailing allowable current ramp rate and a magnitude of change indicated by a current load requirement. The determined value may be applied as an increment to the maximum allowable current. The magnitude of change may be determined as a function of a period of time corresponding to a drying time of one or more fuel cells of the fuel cell system. The drying time may be a time period that a wet cell would take to become sufficiently dry that further drying would not produce further performance decreases when subject to zero current flow and no forced ventilation. The method may further include the step of periodically determining an allowable current ramp rate as a function of an actual measured current and a presently prevailing current ramp rate and at least one of: a rated maximum current for the system; a maximum ramp rate based on the capability of the fuel and/or oxidant delivery system; a period of time corresponding to a drying time of one or more fuel cells of the fuel cell system; and a period of time corresponding to a wetting time of the one or more fuel cells of the fuel cell system. The rated maximum current may comprise a predetermined maximum current for the physical configuration of the fuel cell system. The allowable current ramp rate may be subject to a minimum current ramp rate representing a level of current rate increase that will ensure capture of under-voltage events in the system arising from over-dryness of one or more fuel cells. The method may further include the step of inhibiting an increase in the maximum allowable current in the event of one or more of: (i) a temperature of one or more cells exceeding a predetermined temperature threshold; (ii) one or more cell voltages falling below a predetermined cell voltage threshold; (iii) plural cell voltages exceeding a predetermined range. The method may further including determining the maximum allowable current as a function of one or more of: (i) a total 25 system running time; (ii) a count of the total number of full stop-start cycles to which the fuel cell system has been subjected; (iii) an ambient humidity falling below a predetermined low humidity threshold; (iv) an ambient temperature falling below a predetermined low temperature threshold; (v) an ambient temperature rising above a predetermined high temperature threshold; and (vi) a system voltage.

The method may further include determining the maximum allowable current as a function of the proximity of one or more cell voltages to a minimum cell voltage threshold and/or the proximity of a system temperature to a maximum temperature limit. The method may utilize a proportional-integral controller to restrict the maximum allowable current in order to prevent one or more cell voltages falling below a voltage threshold. The method may utilize a proportional-integral controller to restrict the maximum allowable current in order to prevent one or more stack temperature measurements rising above a maximum temperature limit.

The method may further include determining that the maximum allowable current does not fall below a predetermined minimum current limit. The method may further include the step of overriding the maximum allowable current in the event of one or more of: (i) the system entering a shutdown procedure; (ii) one or more fuel cells of the system being isolated from a load. The method may further include modifying the maximum allowable current as a function of parasitic current load of the system.

According to a further aspect there is provided a controller configured to perform any of the above methods.

According to a further aspect there is provided a fuel cell system comprising: one or more fuel cells disposed in series or in parallel; and the controller. The one or more fuel cells may be air cooled fuel cells.

According to a further aspect there is provided a vehicle comprising the fuel cell system arranged to power said vehicle.

According to a further aspect there is provided a computer program for instructing a controller to perform the above method.

There may be provided a computer program, which when run on a computer, causes the computer to configure any apparatus, including a circuit, controller, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download.

DESCRIPTION OF THE DRAWINGS

A description is now given, by way of example only, with reference to the accompanying drawings, in which.

FURTHER DISCLOSURE

Figure 1:
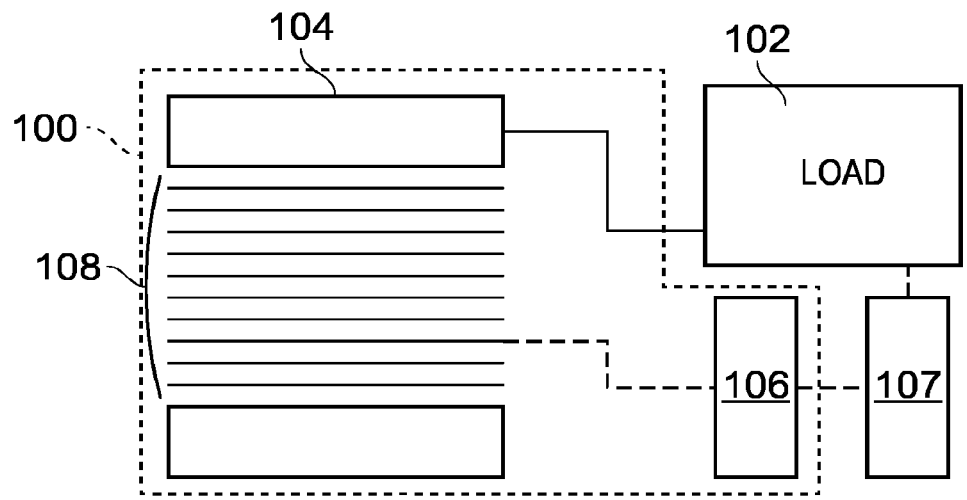
FIG. 1 illustrates a schematic diagram of a fuel cell system and an external electrical load.

FIG. 1 illustrates a schematic diagram of a fuel cell system 100 for a vehicle and an external electrical load 102, such as electric motor or other on-board system of the vehicle. The fuel cell system 100 comprises a fuel cell stack 104 and a limit calculator 106. The fuel cell stack 104 is configured to provide power to the external electrical load 102. The limit calculator 106 is configured to receive signals from the fuel cell system 100 and determine a limit for an amount of current that the load may draw from the fuel cell stack based on the received signals. The limit calculator 106 may be configured to calculate a current limit by considering stack conditions, such as stack and ambient temperature, hydration level and ramp rate, for example. In some examples, a proportional-integral controller may be used as a limit calculator 106 to restrict the current limit in order to prevent one or more cell voltages falling below a voltage threshold, or to prevent one or more stack temperature measurements rising above a maximum temperature limit.

One important stack condition is the hydration state of the fuel cell membranes. Typically, performance of the fuel cell stack (and therefore the power that it can produce) increases as the water content in the membrane increases. This is due to the electrical impedance of the cells dropping due to the presence of conductive water. It is fortunate therefore that the fuel cell stack 104 produces water as a by-product of the electrochemical process which combines hydrogen and oxygen to form water on the cathode (oxygen exposed side) of the cells. The water produced as a result of current flow hydrates the fuel cells 108.

Conversely, the process of increasing current flow though the fuel cell stack 104 along with the polarization characteristics of the cells causes a reduction in voltage from the theoretical open circuit voltage of (typically 1.23 v/cell) to a lower operating voltage of (typically 0.7 v/cell). This lost potential is accounted for by a thermal dissipation that is equivalent to the lost electrical potential. It follows therefore that increased electrical power generation will result in an almost equal increase in thermal dissipation which must be managed by the fuel cell system. The thermal dissipation may be achieved on an air-cooled fuel cell stack by varying a quantity of air that blowers or fans move through the fuel cell stack, including the exposed cathode, in order to maintain an acceptable operating temperature for the electrochemical reaction as the load current varies. The passage of such air across a warm wet surface invariably leads to drying of the surface, removing water from the fuel cell stack by evaporation. It follows that the hydration of the fuel cell stack 104, and therefore the efficiency and performance of the system 100 in which the stack 104 is employed, is subject to varying wetting and drying events caused by changes in operating load and environmental conditions.

The stack hydration condition can be determined by methods such as electro-impedance spectroscopy (EIS), which is capable of using specific frequencies of electrical signals modulated onto the electrical load 102 in order to determine the impedance of the cells 108 attributable to the presence of water in the cells 108. In reality, such systems are 25 complex and may be beyond the cost, weight and volume requirements of real-world applications. Instead, examples of methods for determining a limit current may be based on a number of measured parameters from the fuel cell system 100 that may be readily available as well as some constants and calculations which may be based on characterization report data of the fuel cell stacks.

A load controller 107 is associated with the external electrical load 104. The load controller 107 is configured to receive the current limit from the limit calculator 106 and control the external electrical load 104 in accordance with the received current limit. The current limit may be provided to the load controller 107 through a CAN bus, for example, a vehicle powertrain. The load controller 107 may use the current limit to restrict a DC/DC converter (not shown) from taking more current for the electrical load 104 than the fuel cell system 100 can sustain.

The fuel cell stack 104 in this example comprises a plurality of air cooled fuel cells 108 stacked in series. Alternatively, a fuel cell stack may comprise only a single fuel cell or a plurality of fuel cells provided in parallel. The fuel cell system 100 may comprise a forced ventilation device, such as a blower or a fan, in order to provide air to the fuel cells 108. As a further alternative, a planar array of fuel cells may be provided instead of the stack 104.

Figure 2:
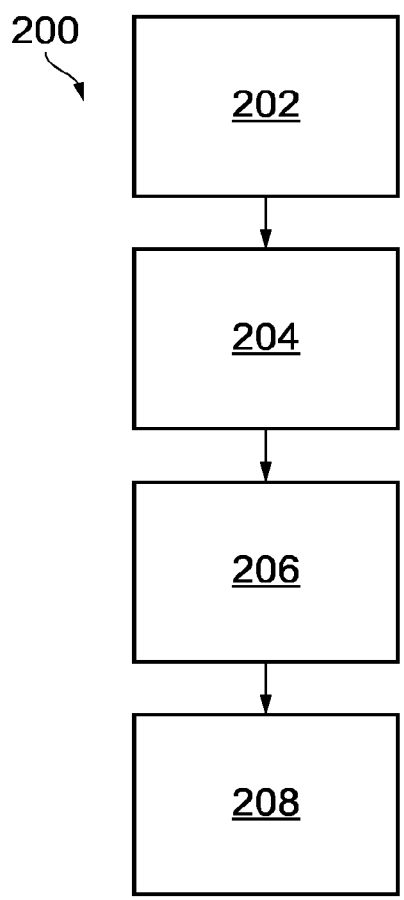
FIG. 2 illustrates a flow chart for controlling the fuel cell system of FIG. 1.

FIG. 2 illustrates a method 200 that may be performed by the limit calculator and load controller of FIG. 1.

The method 200 comprises determining 202 a maximum allowable current that may be drawn from the fuel cell stack. Subsequently, a magnitude of change to the prevailing maximum allowable current is determined 204 based on a prevailing allowable current ramp rate and an actual measured current of the fuel cell stack. The determination 204 of the magnitude of change in the prevailing maximum allowable current may be performed repeatedly, or periodically. After each determination 204, the maximum allowable current is updated 206 according to the determined magnitude of change. Subsequently, operating parameters of the fuel cell stack are controlled 208 according to the prevailing maximum allowable current. Controlling the 208 operating parameters of the fuel cell stack may comprise controlling the external electrical load on the fuel cell stack.

Examples that implementation steps of the method 200 are described in further detail below with reference to the logic arrangement diagrams of FIGS. 3 to 9. In FIGS. 3 to 9, input variables are labelled with an "I" and output variables are labelled with an "O". Preset variables, or constants, are labelled with neither an "I" nor an "O".

Figure 3:
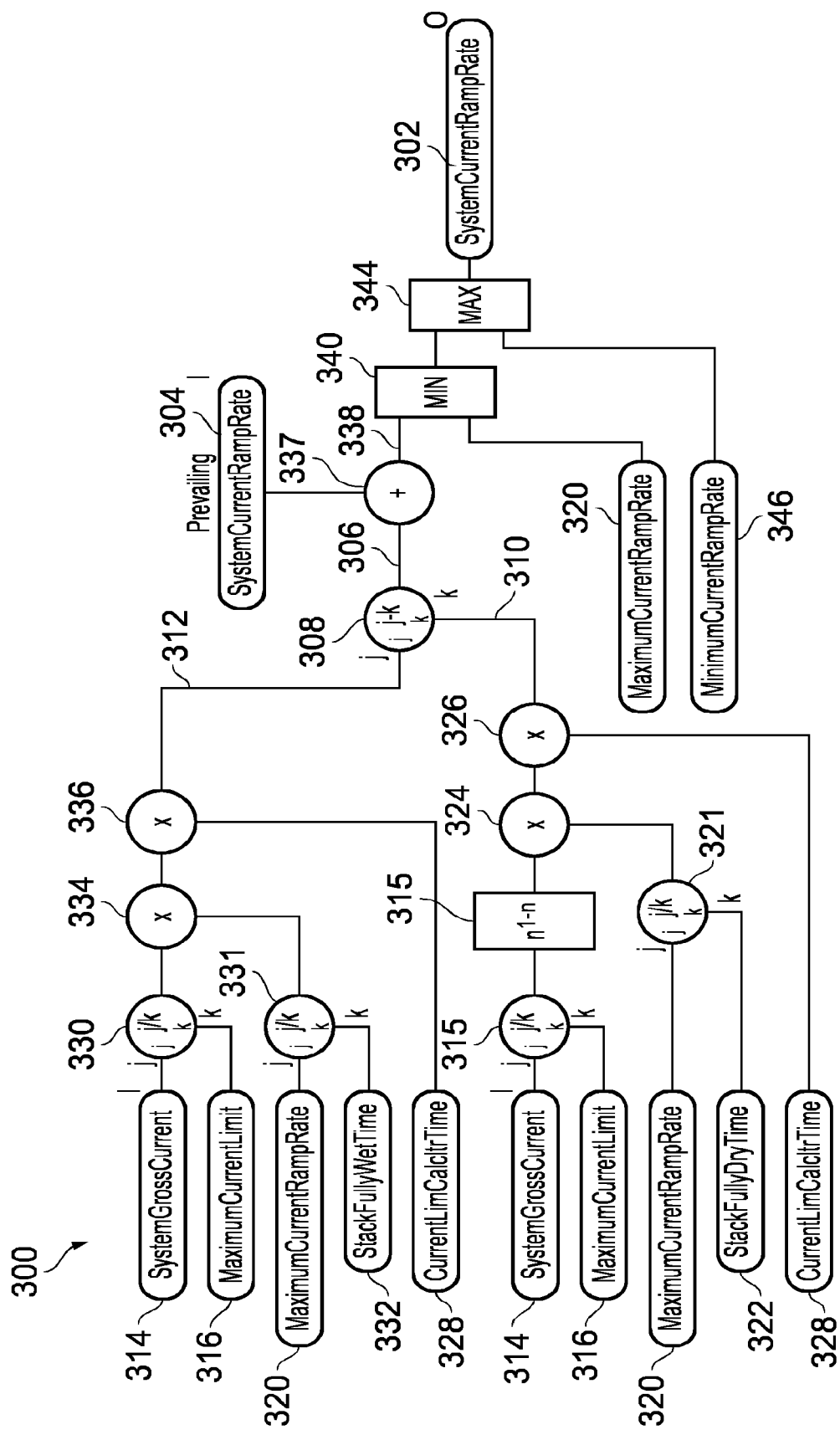
FIG. 3 illustrates a logic arrangement for determining an updated allowable current ramp rate for a fuel cell system such as that of FIG. 1.

FIG. 3 illustrates a logic arrangement 300 for determining an updated allowable current ramp rate (SystemCurrentRampRate) 302, which is used as an input in subsequent a logic arrangement diagrams.

In summary, the SystemCurrentRampRate 302 is determined by adding a prevailing system current ramp rate (PrevailingSystemCurrentRampRate) to a current difference value 306 determined from a difference 308 between a dry current 310 when the stack is fully dry and a wet current 312 when the stack is fully wet. A stack is 'fully wet' when additional current draw or running in a more humid environment makes little or no change to the increased performance of the stack, for example, less than a 1% change in power generation. A stack is 'fully dry' when continued running of fans in a 'typical' environment of 50% relative humidity at 20° C. with the stack in an unloaded state results in no further impedance increase. Impedance of the stack due to water content in the cells may be determined using electrochemical impedance spectroscopy, for example. The current difference value 306 can be positive or negative and so increase or decrease the ramp rate based on stack condition.

In order to determine the dry current 310, a first divider 315 divides an actual measured current delivered to the load (SystemGrossCurrent) 314 by a maximum current limit (MaximumCurrentLimit) 316 and a substation unit 318 subtracts the product of the division from one. The MaximumCurrentLimit 316 is the current that fuel cell stack is a rated, or theoretical, current value that is expected to produce. The MaximumCurrentLimit 316 is limited by the active area of each cell and the current density of the membrane. In parallel with the first divider 315, a second divider 321 divides a maximum current ramp rate (MaximumCurrentRampRate) 320 by a stack fully dry time (StackFullyDryTime) 322. The MaximumCurrentRampRate 320 is the fastest rate at which the calculation should allow the current to be increased. The MaximumCurrentRampRate 320 is set in accordance with the ability of a gas delivery system of the fuel cell state to respond to a step change in current flow, as well as the limitation of control systems to respond to secondary effects of increasing current, such as cell voltage measurement. The StackFullyDryTime 322 is the time that a wet cell would take to become sufficiently dry that further drying does not produce further performance decreases, such as a 1%, 2% or 5% voltage decrease, when subject to zero current flow and no forced ventilation, for example when no air blowers or fans are running. A first multiplier unit 324 multiplies the two parallel paths together. A second multiplier unit 326 multiplies the product of the first multiplication by a current limit calculation control time (CurrentlimCalcltrTime) 328 to give the dry current 310.

In order to determine the wet current 312, a third divider unit 320 divides the SystemGrossCurrent 314 by the maximum current 316. In parallel, a fourth divider unit 331 divides the MaximumCurrentRampRate 320 by a stack fully wet time (StackFullyWetTime) 332. The StackFullyWetTime 332 is the time that a dry cell would take to become sufficiently wet that further wetting does not produce further performance increases, such as a 1%, 2% or 5% voltage increase, when subject to a current flow of the maximum current limit 316, a rated, or theoretical, maximum current for the stack. A third multiplier unit 334 multiplies together the product of both the divided values from the third and fourth divider units 330, 331. A fourth multiplier 336 multiplies the product of the third multiplication by the CurrentlimCalcltrTime 328 to give the dry current value 312. A fifth divider unit 308 determines the difference between the dry current 310 and the wet current 312 to provide a current difference 306. An additional unit 337 calculates a sum of the prevailing system current ramp rate 304 and the current difference 306. A first comparison unit 340 compares the sum to the maximum current ramp rate (MaximumCurrentRampRate) 320. The comparison is such that a greater of the compared values is provided to a second comparator 344 for further comparison with a minimum current ramp rate (MinimumCurrentRampRate) 346. The minimum current 346 is the slowest rate that the current limit calculation can prevent a further increase of current limit should the cell voltage begin to drop once a load is applied. The MinimumCurrentRampRate 346 may be between 1 A/sec and 10 A/sec, for example 5 A/sec, depending upon the response time of current limit calculation and cell voltage detection circuitry. These comparisons 340, 344 ensure that the new calculated ramp rate (SystemCurrentRampRate 302) does not exceed either the maximum or minimum current ramp rates 320, 346.

In this way, an allowable current ramp rate (SystemCurrentRampRate 302) is determined as a function of an actual measured current (SystemGrossCurrent 314) and the presently prevailing current ramp rate (PrevailingSystemCurrentRampRate 304) and at least one of:
- a rated, or theoretical, maximum current (MaximumCurrentlimit 316) for the stack;
- a maximum ramp rate (MaximumCurrentRampRate 320) based on the capability of the fuel and/or oxidant delivery system;
- a period of time corresponding to a drying time (StackFullyDryTime 322) of the fuel cell stack; and
- a period of time corresponding to a wetting time (StackFullyWetTime 332) of the fuel cell stack.

Figure 4:
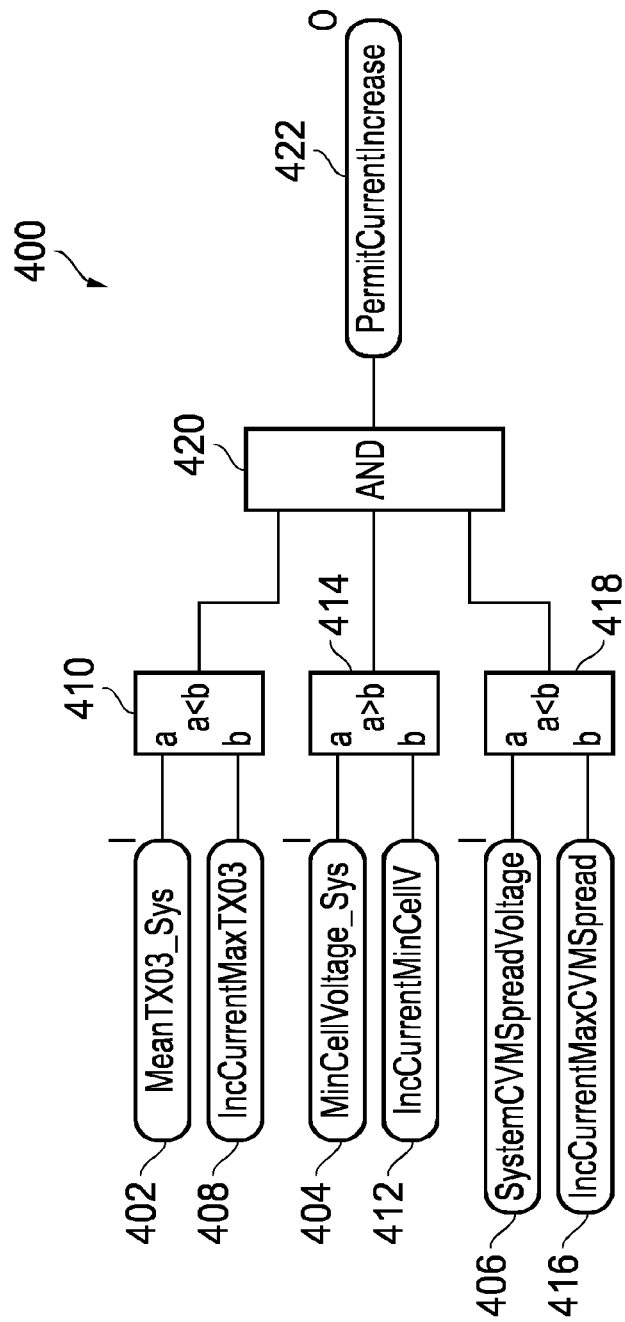
FIG. 4 illustrates a logic arrangement for determining fuel cell conditions for a fuel cell system such as that of FIG. 1.

FIG. 4 illustrates a logic arrangement 400 for determining fuel cell conditions based on an actual mean temperature of fuel cells (MeanTX03_Sys) 402 within a fuel cell system, a minimum stack cell voltage (MinCellVoltage_Sys) 404 and a CVM system voltage spread (SystemCVMSpreadVoltage) 406. Each of these values is compared against a threshold specific to the variables ability to support a current increase. If all of the variables do not meet the required condition then current increase is not permitted.

A first comparator 410 compares the actual mean temperature (MeanTX03_Sys) 402 with a predetermined temperature threshold (IncCurrentMaxTX03) 408 of the fuel cell stacks. lncCurrentMaxTX03 408 may be selected to prevent the current increasing if the stack temperature is too hot in order to prevent further overheating. In some examples, the lncCurrentMaxTX03 408 may be adjacent to a trip threshold for the fuel cell stack. The IncCurrentMaxTX03 408 may be greater than the peak performance temperature as temporary excursions above the peak performance temperature may be acceptable while the cooling system responds to a step change, for example.

A second comparator 414 compares the minimum stack cell voltage (MinCellVoltage_Sys) 404 with a predetermined cell voltage threshold (IncCurrentMinCellV) 412 below which no further increases in system current limit is permitted. IncCurrentMinCellV 412 may be selected to prevent fuel cell protection mechanisms from tripping out because excessive current drawn from the stack has caused the cell voltage to drop too low.

SystemCVMSpreadVoltage 406 is the difference between the voltage of the lowest cell voltage in the fuel cell stack and the voltage of the highest cell voltage in the fuel cell stack. A fuel cell stack with too much water on the anode will show a relatively high value for this parameter. A third comparator 418 compares the predetermined cell voltage threshold (SystemCVMSpreadVoltage) 406 with a predetermined range (IncCurrentMaxCVMSpread) 416, which is a threshold above which no further current increase is permitted. IncCurrentMaxCVMSpread 416 may be chosen based on a risk of the occurrence of further cell voltage drops caused by increased current flow and water production until such events as purge can clear the water build up.

A three-way AND operation 420 is performed on the outputs of the three comparators 410, 414, 418 in order to set a permit current increase flag (PermitCurrentIncrease) 422, which may take a Boolean value. In this way, an increase in the maximum allowable current may be inhibited in the event of one or more of:
  a temperature of one or more cells in the stack exceeding a predetermined temperature threshold;
  one or more cell voltages falling below a predetermined cell voltage threshold;
  a plurality of cell voltages exceeding a predetermined range.

Figure 5:
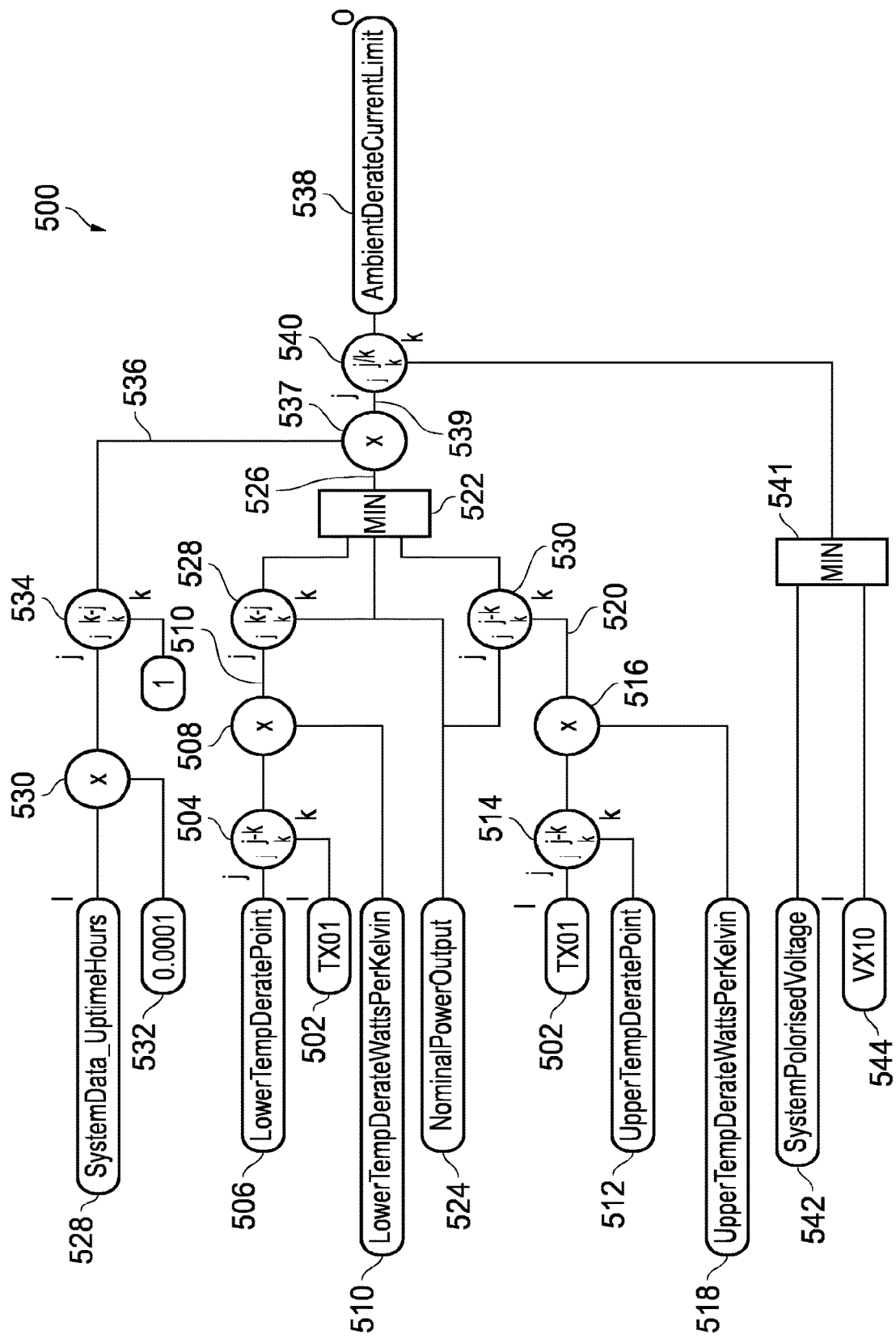
FIG. 5 illustrates a logic arrangement for determining an ambient derate current limit for a fuel cell system such as that of FIG. 1.

FIG. 5 illustrates a logic arrangement 500 for determining an ambient derate current limit by using one of the:
  power 510 required if the system is cold.
  power 524 required if the system is in a normal state.
  power 520 required if the system is running hot.

A first subtraction unit 504 subtracts a measured ambient temperature (TX01) 502 from an ambient temperature below which delivered power is reduced in order to accommodate parasitic loads of a fuel cell system (LowerTempDeratePoint) 506. A first multiplier 508 multiples the difference determined by the subtraction unit 504 by a reduction in the amount (LowerTempDerateWattsPerKelvin) 510 of electrical energy that the fuel cell system produces per degree of temperature below the LowerTempDeratePoint 506 in order to provide the power 510 required if the system is operating in cold conditions.

A second subtraction unit 514 subtracts an ambient temperature above which the delivered power is reduced to accommodate parasitic loads of the fuel cell system (UpperTempDeratePoint) 512 from the measured ambient temperature (TX01) 502. A second multiplier unit 516 multiplies the difference determined by the second subtraction unit 514 by an amount (UpperTempDerateWattsPerKelvin) 512 of electrical energy the fuel cell system produces per degree of temperature above the UpperTempDeratePoint 512 in order to provide the power 520 required if the system is operating in hot conditions.

A third subtraction unit 528 subtracts the power 510 required if the system is cold from a reference value for the nominal power output of the system operating in normal conditions (NominalPowerOutput) 524. A fourth subtraction unit 530 subtracts the power 520 required if the system is hot from the NominalPowerOutput 524. A first comparison unit 522 makes a comparison in order to determine a minimum value 526 of:
  the NominalPowerOutput 524;
  a difference found by subtracting the power 510 required if the system is operating in cold conditions from the NominalPowerOutput 524; and
  a difference found by subtracting the power 520 required if the system is operating in hot conditions from the NominalPowerOutput 524.

A third multiplier unit 530 multiples the number of hours the system has been operating (SystemData_UptimeHours) by a scaling factor 532. A fifth subtraction unit 534 subtracts the product of the multiplication from one in order to provide a lifetime scaling product 536. A fourth multiplier unit 537 multiplies the minimum value 526 determined by the first comparison unit 522 by the lifetime scaling product 536 in order to provide a degradation corrected power 539 that it is reduced by a percentage depending on the age of the stack. The lifetime scaling product 536 is provided in order to account for a reduction in output voltage of the stack for a given current flow between beginning-of-life (Bal) power and end-of-life (Eal) power caused by degradation of the cathode. In some examples, it is important that the logic calculates this degradation as the current limit is calculated in order to meet the power specification of the system. If the expected power delivery specification decreases over the life of the system (due to degradation) and this is not considered by the calculation then the controller may attempt to increase the current at end of life in order to accommodate for the reduction in voltage. Such action may result in greatly increased thermal dissipation within the fuel cell stack. In some cases, the increased thermal dissipation may be greater than that which can be accommodated by the system.

A second comparison unit 541 determines the lower of a rated, or theoretical, nominal system voltage (SystemPolarisedVoltage) 542 and the output voltage of the system (VX10). In some stacked topologies, the SystemPolarisedVoltage 542 may be 100.8 V, with each cell operating at 0.7 V. The purpose of this determination is so that initial current calculations which are made when the system is at open circuit voltage are not unrealistically small. By making an assumption of the drop in voltage due to loading of at most 0.7 v per cell, the initial calculation of current limit may be made more accurate because the voltage drop when that load is applied is anticipated. Of course if the actual voltage is lower than expected then the minimum of rule applies and more current is supplied to achieve the desired power.

A first divider 540 calculates an ambient current limit (AmbientDerateCurrentLimit) 538 by dividing the degradation corrected power 539 by the lower 541 of a theoretical nominal system voltage (SystemPolarisedVoltage) 542 and the output voltage 544 of the system (VX10) provide by the second comparison unit 541. The current rating of the fuel cell stack, as set by the MaximumCurrentLimit 316, will remain the same throughout the life of the stack. However, at beginning-of-life (Bal) the voltage delivered by the fuel cell stack for a given current is higher than at the end-of-life (Eal). The current limit calculation considers the overall voltage output (VX10) 544 and determines the current limit that is required to deliver the expected power based on this, thereby accounting for Bol to Eol voltage differences (i.e. current increases through life, voltage drops and therefore efficiency drops).

The constants, such as NominalPowerOutput 524, may be selected to ensure that parasitic energy requirements of the system are met within the gross stack current capabilities and the capabilities of the parasitic elements (fans, blowers, heaters) to maintain an acceptable operating environment for the fuel cell system during its operation. The NominalPowerOutput 524 may also be selected with consideration to the expected power delivery (specification) of the system as well as any anticipated off-lo time of the output due to conditioning events of the stack ('fan-pulsing') such that a particular net average power output over a period of time is achieved. In this way, the maximum allowable current (which relates to the AmbientDerateCurrentLimit 538) may be determined as a function of one or more of:
- a total system running time (SystemData_UptimeHours 528);
- an ambient temperature (TX01 502) falling below a predetermined low temperature threshold (LowTempDeratePoint 506);
- the ambient temperature (TX01 502) rising above a predetermined high temperature threshold (UpperTempDeratePoint 512); and
- a stack voltage (VX10 544).

In an alternative example, the AmbientDerateCurrentLimit 538 may in addition be determined as a function of one or both of:
- a count of the total number of full stop-start cycles to which the fuel cell stack has been subjected; and
- an ambient humidity falling below a predetermined low humidity threshold.

Figure 6:
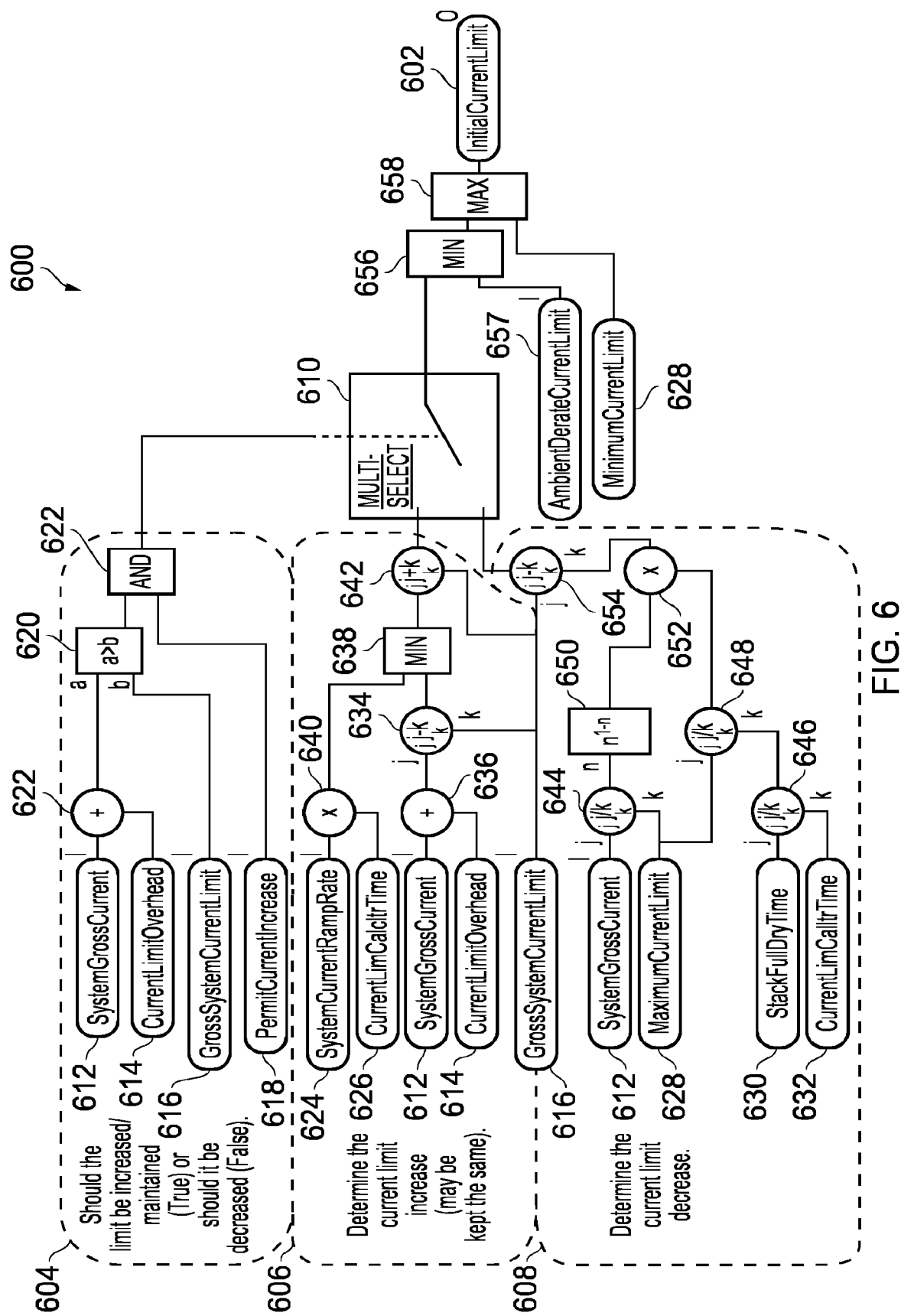
FIG. 6 illustrates a logic arrangement determining an initial current limit for a fuel cell system such as that of FIG. 1.

FIG. 6 illustrates a logic arrangement 600 for determining an initial current limit (InitialCurrentLimit) 602. The InitialCurrentLimit 602 is a gross system current limit which has not yet been factored for stack state based de-rating. The InitialCurrentLimit 602 is an example of a maximum allowable current that may be drawn from the fuel cell stack.

The logic arrangement 600 has three separate logic paths 604, 606, 608 which are combined by a multi-selector 610. The second logic path 606 periodically determines an amount of current by which the InitialCurrentLimit 602 should be increased. The third logic path 608 periodically determines an amount of current by which the InitialCurrentLimit 602 should be decreased. An output of the first logic path 604 is used to control whether the multi-selector 610 selects the second logic path 606 or the third logic path 608, that is, whether to increase or decrease the InitialCurrentLimit 602.

The first logic arrangement path 604 receives as inputs:
- an actual measured current delivered to a load (SystemGrossCurrent) 612;
- an amount of current (CurrentLimtOverhead) 614 that the system will accept above what is currently being drawn in order to detect increases in current drawn by the load;
- a limit for the current delivered to the load (GrossSystemCurrentLimit) 616, which may be calculated using the logic arrangement described below in FIG. 8, for example; and
- a Boolean value that indicates whether a current increase should be permitted (PermitCurrentIncrease) 618, which may be calculated using the logic arrangement described previously with regard to FIG. 4, for example.

In the first logic path 602, a comparator 620 determines the greater of the GrossSystemCurrentLimit 616 and the sum 622 of the SystemGrossCurrent 612 and the CurrentLimtOverhead 614. An AND operation 624 is then performed on the larger of these values and the PermitCurrentIncrease 618 Boolean value in order to provide the selection state for the multi-selector 610. If the load on the system is attempting to draw current which is approaching the GrossSystemCurrentLimit 616 and the stack is in a condition to allow an increase then the multi-selector 610 is set to allow the InitialCurrentLimit 602 to be set by the second a logic arrangement path 606.

The second a logic arrangement path 606 receives as inputs:
- a prevailing allowable current ramp rate (SystemCurrentRampRate) 624, which may be calculated using the logic arrangement described previously with reference to FIG. 3, for example;
- a current limit calculation control time (CurrentLimCalcltrTime) 626, which may be similar to that described previously with reference to FIG. 3;
- the SystemGrossCurrent 612;
- the CurrentlimtOverhead 614; and
- the GrossSystemCurrentLimit 616.

In the second logic path 606, a first subtracter 634 subtracts the GrossSystemCurrentLimit 616 from a sum of the SystemGrossCurrent 612 and the CurrentLimtOverhead 614 calculated by a second addition unit 636. The result of this subtraction is compared by a first comparison unit 638 with the product of the SystemCurrentRampRate 624 and the CurrentLimCalcltrTime 626 in order to determine which is lowest. A third addition unit 642 adds the lower of these values to the GrossSystemCurrentLimit 616 and provides a second logic path input to the multi-selector 610. The second logic path input provides a magnitude of change to the prevailing maximum allowable current based on the SystemCurrentRampRate 624 and the GrossSystemCurrentLimit 616. In this way, the InitialCurrentLimit 602 is derived from the lower of: (i) the SystemCurrentRampRate 624 normalized over time to create a new current limit; and (ii) the SystemGrossCurrent 612 plus the CurrentLimtOverhead 614, which may be 2 A, minus the GrossSystemCurrentLimit 616 from previous current demand. The second logic path 606 therefore prevents cycling or fluctuation of the InitialCurrentLimit 602 while operating near to the InitialCurrentLimit 602.

The third logic path 608 receives as inputs:
- the GrossSystemCurrentLimit 616;
- the SystemGrossCurrent 612;
- a theoretical current value (MaximumCurrentLimit) 628 that the fuel cell system is expected to produce at beginning-of-life (Bol);
- a period (StackFullyDryTime) 630 that a fully wet cell would take to become sufficiently dry that further drying does not produce further performance decreases, within a 2% margin of error for example, when subject to no current flow with air blowers or fans running.
- CurrentlimCalcltrTime 328 is the time period between calculations of the InitialCurrentLimit 602. The MaximumCurrentLimit 628, StackFullyDryTime 630 and CurrentLimCalcltrTime 632 may be similar to the corresponding values described previously with reference to FIG. 3.

In the third logic path 608, a first divider 644 divides the SystemGrossCurrent 612 by the MaximumCurrentLimit 628. A 1−n operation 650 is performed on an output of the first divider 644. A second divider 646 divides the Stack- FullyDryTime 630 by the CurrentLimCalcltrTime 632. A third divider 648 divides the MaximumCurrentLimit 628 by the output of the second divider 646. A first multiplier 652 multiplies an output of the third divider 648 by an output of the 1−n operation 650. A first subtraction unit 654 deducts a product of the multiplication from the GrossSystemCurrentLimit 616 and the resulting magnitude of change is provided as a third logic path input to the multi-selector 610. In this way, a percentage of current draw available between the SystemGrossCurrent 612 and the MaximumCurrentLimit 628 is determined. The percentage is used to determine how much current to take off the GrossSystemCurrentLimit 616. This is done by multiplying the amount of current that the stack can still supply the load with by the percentage current overhead available. This gives a small decrease in initial current limit which over time will eventually reach a limit just above the current the load is demanding. This slow decrease in current limit allows the load to return to higher current demands without imposing an immediate limit. It is thought that it is possible to support this behaviour within the fuel cell because the membrane drying effect is slower than the wetting effect.

An output of the multi-selector 610 is compared by a second comparison unit 656 with an ambient current limit (AmbientDerateCurrentLimit) 657, which may be provided using the logic arrangement described previously with reference to FIG. 5, and the lower of the compared values is provided as an output of the second comparison unit 656. A third comparison unit 658 compares the output of the second comparison unit 656 with the MaximumCurrentLimit 628 and the greater of the compared values is provided as the InitialCurrentLimit 602. In this way, the InitialCurrentLimit 602 is updated according to, or based on, the determined magnitude of change provided by the second logic path 606 or the third logic path 606.

Figure 7:
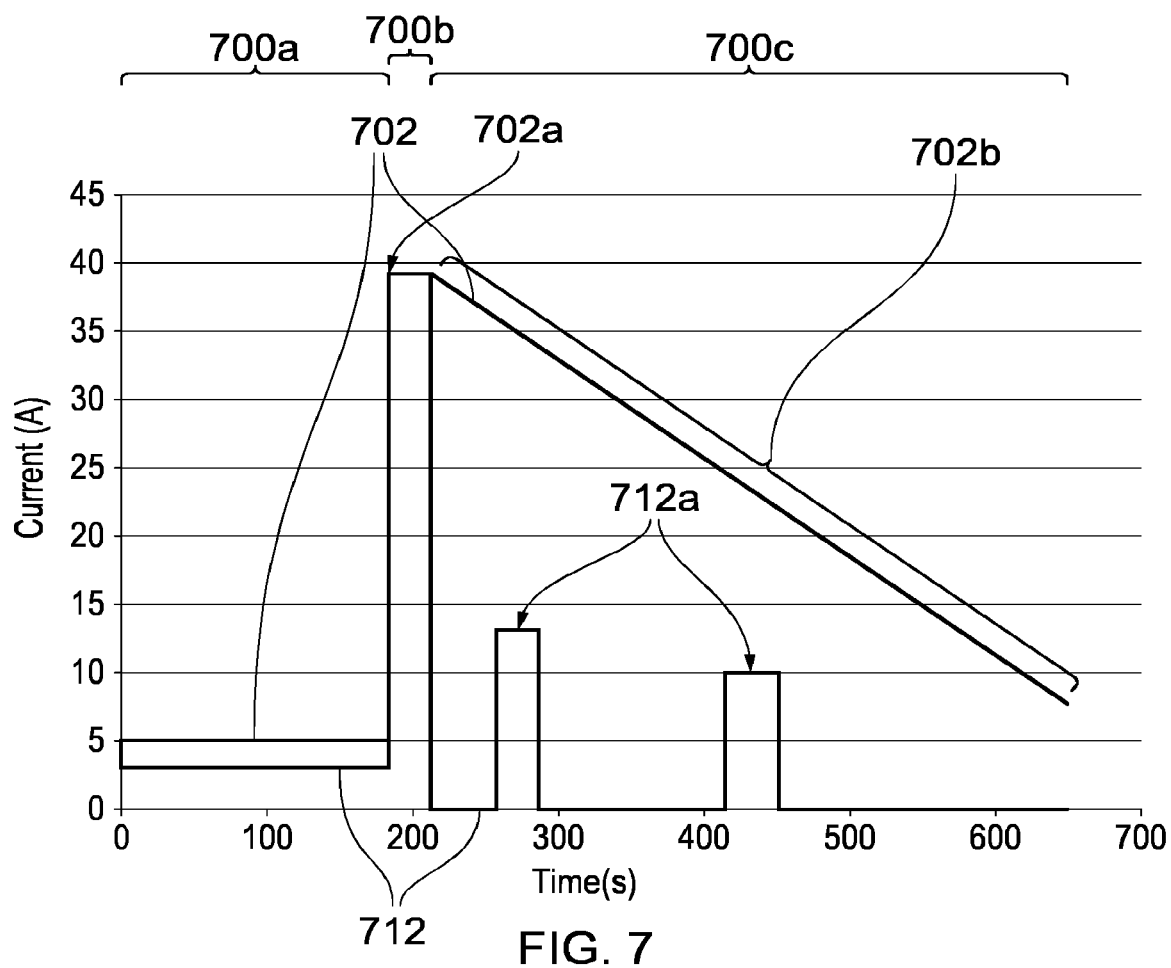
FIG. 7 illustrates profiles for a load on a fuel cells system and a corresponding initial current limit calculated using the logic arrangement of FIG. 6.

FIG. 7 illustrates profiles, as a function of time, for the InitialCurrentLimit 702 calculated by the example system comprising the logic arrangement of FIG. 6 based on the actual measured current delivered to an external load (SystemGrossCurrent) 712, which is an input variable for the logic arrangement of FIG. 6.

The profiles in FIG. 7 are separated into a number of periods 700a, 700b, 700c. In a first period 700a, the InitialCurrentLimit 702 has a stable value of 5 A, which is greater than the SystemGrossCurrent 712 (about 3 A). At the beginning of a subsequent second period 700b, the InitialCurrentLimit 702a increases asymptotically to about 39 A in order to accommodate an increased SystemGrossCurrent 712. The InitialCurrentLimit 702 and SystemGrossCurrent 712 are then similar and both constant during the second period 700b. At the beginning of a subsequent third period 700c, the SystemGrossCurrent 712 falls asymptotically to 0 A. The InitialCurrentLimit 702b also decreases during the third period 700c, although at a lower rate than the SystemGrossCurrent 712. The rate of decrease of the InitialCurrentLimit 702b is determined by the third logic path in FIG. 6 in accordance with the fuel cell stack drying rate (StackFullyDryTime). As discussed above with reference to FIG. 6, the relatively slow decrease in the InitialCurrentLimit 702 enables the SystemGrossCurrent 712a to return to higher current demands during the third period without the need to impose an immediate change in the InitialCurrentLimit 702. This feature is particularly useful for applications in which frequent toggling between high and low demand occurs, such as is in vehicular applications. For example, during a vehicle drive cycle the vehicle may be driven to a level that has increased the current limit by torque limiting from start-up. If the vehicle is subsequently stopped at a traffic junction, no torque limit would need to be imposed because the fuel cell would immediately be able to support the load on acceleration without further current limiting.

Figure 8:
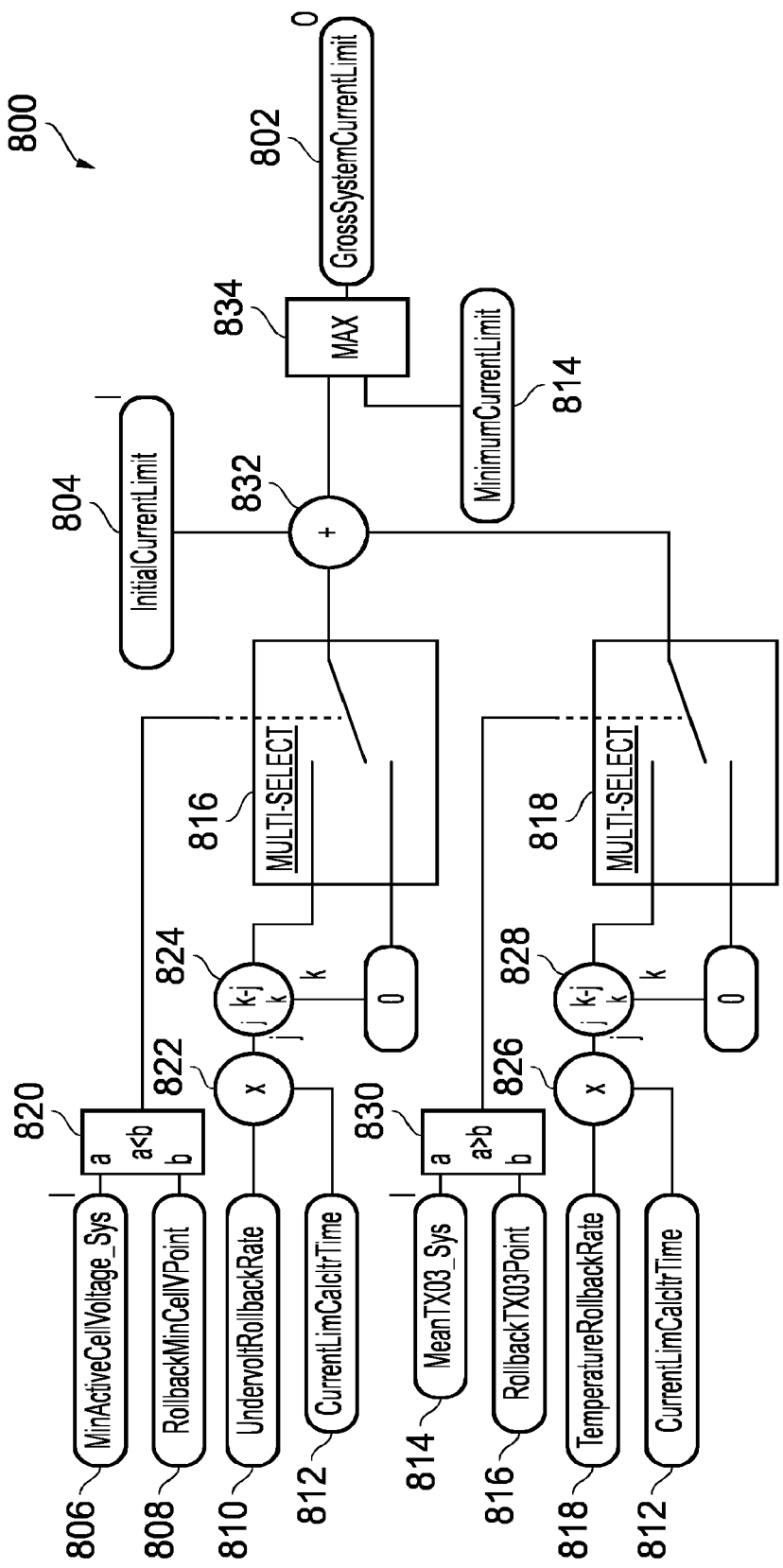
FIG. 8 illustrates a logic arrangement for determining a gross system current limit for a fuel cell system such as that of FIG. 1.

FIG. 8 illustrates a logic arrangement 800 for determining a gross system current limit (GrossSystemCurrentLimit) 802 for use with the logic arrangement described previously 15 with reference to FIG. 6. The GrossSystemCurrentLimit 802 is an example of a maximum allowable current that may be drawn from the fuel cell stack.

The logic arrangement 800 receives the following as inputs:

a maximum allowable current (InitialCurrentLimit) 804 that may be drawn from the fuel cell stack;

one or more cell voltages (MinActiveCellVoltage) 806;

a minimum cell voltage threshold (RollbackMinCellVPoint) 808;

a rate (UndervoltRollbackRate) 810 at which the GrossSystemCurrentLimit 802 is reduced if the voltage is insufficient;

a current limit calculation control time (CurrentlimCalcltrTime) 812, which may be similar to the corresponding feature described previously with reference to FIG. 3;

an actual mean temperature of the fuel cell stack (MeanTX_Sys) 814, which may be similar to that described previously with reference to FIG. 4;

a maximum temperature limit (RollbackTX03Point) 816;

a rate (TemperatureRollbackRate) 818 at which the GrossSystemCurrentLimit 802 is reduced if the temperature is too high; and a predetermined minimum current limit (MimimumCurrentLimit) 814.

The logic arrangement 800 comprises a first multi-selector 816 and a second multi-selector 818.

A first summation unit 822 multiplies the UndervoltRollbackRate 810 by the CurrentLimCalcltrTime 812 and provide the product to a first operator 824. The first operator 824 provides an input of the multi-selector 816 that is equal to zero minus the product. A second input of the multi-selector 816 is set at zero. A first comparator 820 compares the MinActiveCellVoltage 806 and the RollbackMinCellVPoint 808 and controls the selection by the first multi-selector 816 in accordance with the comparison.

A second summation unit 826 multiplies the TemperatureRollbackRate 818 by the CurrentlimCalcltrTime 812 and provide the product to a second operator 828. The second operator 828 provides an input of the multi-selector 818 that is equal to zero minus the product. A second input of the multi-sector 818 is set at zero. A second comparator 830 compares the MeanTX_Sys 814 and the RollbackTX03Point 816 and controls the selection by the second multi-selector 818 in accordance with the comparison.

An addition unit 832 adds together an output of the first multi-selector 816, an output of the second multi-selector 818 and the InitialCurrentLimit 804. A first comparison unit 834 compares an output of the addition unit 832 and the MimimumCurrentLimit 814 and provides the greater of these values as the GrossSystemCurrentLimit 802.

In this way, the GrossSystemCurrentLimit 802 is reduced if the logic arrangement 800 detects an imminent cell under voltage, thereby preventing the system under voltage protection from tripping, or if the logic arrangement 800 detects that the system is approaching an over temperature trip, thereby preventing a system over temperature trip. If the logic arrangement 800 does not detect either an imminent under voltage or over temperature condition, then the Gross- SystemCurrentLimit 802 will be set as the InitialCurrentLimit 804. The comparison with the MimimumCurrentLimit 814 is used to ensure that the gross system current limit cannot go below the minimum.

In this example, the GrossSystemCurrentLimit 802 is determined as a function of the proximity of one or more cell voltages (MinActiveCellVoltage) to a minimum cell voltage threshold (RollbackMinCellVPoint) and/or the proximity of a stack temperature (MeanTX_Sys) to a maximum temperature limit (RollbackTX03).

Figure 9:
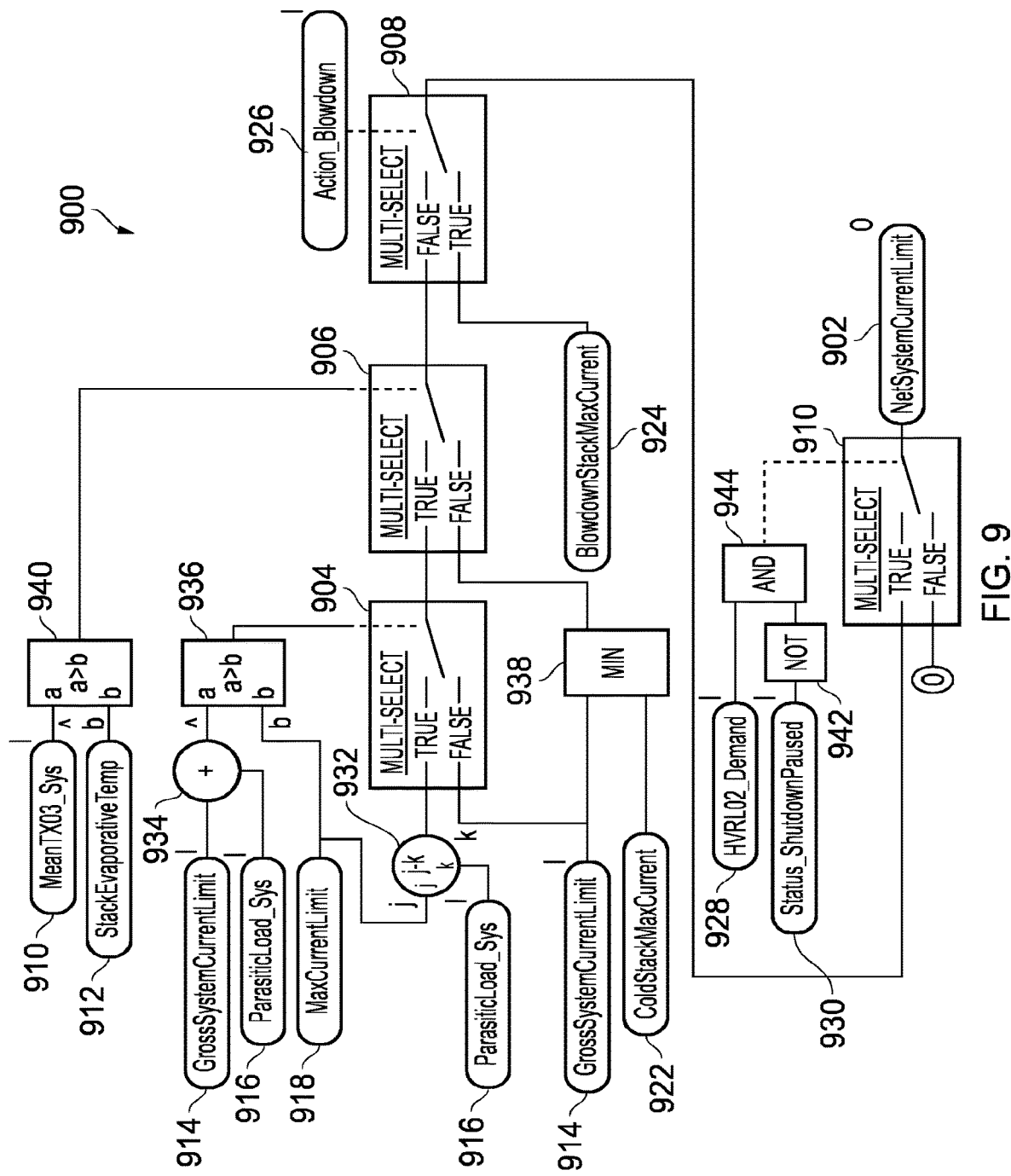
FIG. 9 illustrates a logic arrangement for determining a net system current limit for a fuel cell system such as that of FIG. 1.

FIG. 9 illustrates a logic arrangement 900 for determining a net system current limit (NetSystemCurrentLimit) 902, which is another example of a maximum allowable current that may be drawn from the fuel cell stack. The NetSystemCurrentLimit 902 is the value passed to the vehicle as the current limit and may also be referred to as a published current limit because it is 'published' by the fuel cell system to the load controller of the vehicle. The NetSystemCurrentLimit 902 is the current limit for external loads, whereas the GrossSystemCurrentLimit referred to previously is a current limit for all loads, including external and parasitic loads of a fuel cell system. The GrossSystemCurrentLimit is first determined by previous logic arrangement and the NetSystemCurrentLimit 902 is then determined by considering a remnant current after accounting for parasitic loads.

The logic arrangement 900 receives the following as inputs:
- an actual mean temperature of fuel cells (MeanTX03_Sys) 910 within a fuel cell system;
- a preset temperature (StackEvaporationTemp) 912 at which there is sufficient heat within the fuel cell system for water to evaporate;
- a gross system current limit (GrossSystemCurrentLimit) 914, such as that calculated by the logic arrangement described previously with reference to FIG. 8;
- a measured value for prevailing parasitic loads (Parasiticloads_Sys) 916 on the system, such as the power consumed by blowers and fans;
- a theoretical current value (MaxCurrentlimit) 918 that the fuel cell system is expected to produce at beginning of life, which may be similar to the corresponding MaximumCurrentLimit values described previously with reference to FIG. 3;
- a theoretical maximum current (ColdStackMaxCurrent) 922 that may be drawn from a cold fuel cell system, for example shortly after start up or during a blowdown procedure (when fans are used to remove water from the stack);
- a theoretical maximum current (BlowdownStackMaxCurrent) 924 that may be drawn from the cold fuel cell system during blow down;
- a blowdown trigger (Action_Blowdown) 926 that indicates that a blowdown procedure is in progress;
- the status of the main output contactor (HVRL02_Demand) 928, which indicates whether the fuel cell system is connected to the load or not;
- an indication whether shutdown has been paused (Status_ShutdownPaused) 930, in which case there is no load demand.

The logic arrangement 900 comprises a first multi-selector 904, a second multi-selector 906, a third multi-selector 908 and a fourth multi-selector 910. Each multi-selector 904, 906, 908, 910 has a first input, a second input, an output and a select input for selecting which of its first and second input is connected to the output.

A subtraction unit 932 subtracts the Parasiticloads_Sys 916 from the MaxCurrentLimit 918 and provides the difference as a first input to the first multi-selector 904. The GrossSystemCurrentLimit 914 is provided as a second input of the first multi-selector 904.

An addition unit 934 adds the Parasiticloads_Sys 916 to the MaxCurrentLimit 918 and provides the sum as an input of a first comparator 936. The MaxCurrentLimit 918 is provided as a second input of the first comparator 936. An output of the first comparator 936 is provided to the select input of the first multi-selector 904.

The output of the first multi-selector 904 is provided as the first input of the second multi-selector 906. A first comparison unit 938 compares the GrossSystemCurrentLimit 914 and the ColdStackMaxCurrent 922 and provides the lower of these two values as the second input of the second multi-selector 906. A second comparator 940 compares the MeanTX03_Sys 910 with the ColdStackMaxCurrent 922 and provides the select input of the second multi-selector 906 in accordance with the comparison.

The output of the second multi-selector 906 is provided as the first input of the third multi-selector 908. The BlowdownStackMaxCurrent 924 is provided as the second input for the third multi-selector 908.

The output of the third multi-selector 906 is provided as the first input of the fourth multi-selector 910. A zero value is provided as the second input the fourth multi-selector 910.

A NOT gate 942 applies a NOT operation to the Status_ShutdownPaused 930. An AND gate 944 performs an AND operation on the inverted Status_ShutdownPaused 930 provided by the NOT gate 942 and the HVRL02_Demand 928. The HVRL02 demand 928 is used to determine if the NetSystemCurrentLimit 902 should be 'O'—if the contactor is open then no current flow is possible. The AND gate 944 controls the select input of the fourth multi-selector 910 in accordance with the AND operation. The output of the fourth multi-selector 910 provides the NetSystemCurrentLimit 902. In this way, the NetSystemCurrentLimit 902 is determined dependent on a number of system conditions.

If the system is in a paused shutdown state and the high side contactor is not engaged then the system is isolated from the external load. In this case the current limit is 0 A because it is not possible to draw current from the system. Otherwise the limit is determined from the previous stages in the logic arrangement 900.

If the system is in blowdown the current limit is set to the max current allowed in blowdown.

Otherwise the NetSystemCurrentLimit 902 is determined in the previous stages in the logic arrangement 900. The current limit in these stages is determined by checking that the core temperature is sufficient to maintain evaporation of water developed in the fuel cell system. If the temperature is sufficient then the NetSystemCurrentLimit 902 is set to the max current limit less any parasitic currents. If the temperature is not sufficient then the NetSystemCurrentLimit 902 is set to the lowest of the GrossSystemCurrentLimit 914 and the ColdStackMaxCurrent 922.

If the calculated NetSystemCurrentLimit 902 along with the parasitic load presented by the system exceed the MaxCurrentLimit then the NetSystemCurrentLimit 902 is reduced to accommodate the parasitic loads.

The invention claimed is:
1. A method of operating a fuel cell system comprising:
repeatedly determining a maximum allowable current that may be drawn from the fuel cell system based on at least one of a prevailing allowable current ramp rate, an actual measured current of the fuel cell system, and a parasitic current load of the fuel cell system; and controlling a plurality of operating parameters of the fuel cell system according to a most recent determination of the maximum allowable current as a function of one or more of:
(i) a total system running time;
(ii) a count of the total number of full stop-start cycles to which the fuel cell system has been subjected;
(iii) an ambient humidity falling below a predetermined low humidity threshold;
(iv) an ambient temperature falling below a predetermined low temperature threshold;
(v) an ambient temperature rising above a predetermined high temperature threshold;
(vi) a system voltage;
(vii) the proximity of one or more cell voltages to a minimum cell voltage threshold and/or the proximity of a system temperature to a maximum temperature limit and,
(viii) the maximum allowable current does not fall below a predetermined minimum current limit.

2. The method of claim 1 in which the step of controlling operating parameters of the fuel cell system comprises controlling an electrical load on the fuel cell system.

3. The method of claim 1 in which the most recent determination of the maximum allowable current comprises an increment or a decrement with respect to a less recent determination of the maximum allowable current.

4. The method of claim 1 in which the most recent determination of the maximum allowable current is determined according to the smaller of a magnitude of change corresponding to the prevailing allowable current ramp rate and a magnitude of change indicated by a current load requirement.

5. The method of claim 1 in which the most recent determination of the maximum allowable current is determined as a function of a period of time corresponding to a drying time of one or more fuel cells of the fuel cell system.

6. The method of claim 1 further including the step of periodically determining an allowable current ramp rate as a function of an actual measured current and a presently prevailing current ramp rate and at least one of: a rated maximum current for the system; a maximum ramp rate based on the capability of the fuel and/or oxidant delivery system; a period of time corresponding to a drying time of one or more fuel cells of the fuel cell system; and a period of time corresponding to a wetting time of the one or more fuel cells of the fuel cell system.

7. The method of claim 6 in which the rated maximum current comprises a predetermined maximum current for the physical configuration of the fuel cell system.

8. The method of claim 1 further including the step of inhibiting an increase in the maximum allowable current in the event of one or more of:
(i) a temperature of one or more cells exceeding a predetermined temperature threshold;
(ii) one or more cell voltages falling below a predetermined cell voltage threshold;
(iii) plural cell voltages exceeding a predetermined range.

9. The method of claim 1 further including the step of overriding the maximum allowable current in the event of one or more of:
(i) the system entering a shutdown procedure;
(ii) one or more fuel cells of the system being isolated from a load.

10. A fuel cell system comprising:
one or more fuel cells disposed in series or in parallel; and
a controller conformed to perform the method of claim 1; and,
in which the one or more fuel cells are air cooled fuel cells.

11. A vehicle comprising the fuel cell system of claim 10 for powering said vehicle.

* * * * *